United States Patent [19]

Heap et al.

[11] Patent Number: 5,835,056
[45] Date of Patent: Nov. 10, 1998

[54] APPARATUS FOR DIRECTING A MOBILE CRAFT TO A RENDEVOUS WITH ANOTHER MOBILE CRAFT

[75] Inventors: Eric Heap, Yateley; Peter John Herbert, Farnham, both of England

[73] Assignee: The Secretary of State for Defence in Her Britannic Majesty's Government of the United Kingdom of Great Britain and Northern Ireland, United Kingdom

[21] Appl. No.: 628,040

[22] Filed: Oct. 31, 1975

[51] Int. Cl.⁶ ........................................................ G01S 13/72
[52] U.S. Cl. .............................................. 342/62; 244/3.14
[58] Field of Search ...................... 244/3.14; 235/150.26, 235/150.27, 61.5 S; 342/62, 63

[56] References Cited

U.S. PATENT DOCUMENTS

| | | | |
|---|---|---|---|
| 2,979,262 | 4/1961 | Penley et al. | 235/150.26 |
| 3,034,228 | 5/1962 | Giloth | 235/150.27 |
| 3,078,041 | 2/1963 | Bomberger | 235/150.26 |
| 3,260,478 | 7/1966 | Welti | 244/3.14 |
| 3,527,429 | 9/1970 | Hawes, Jr. et al. | 244/3.14 |
| 3,743,215 | 7/1973 | Harris | 244/3.14 |

*Primary Examiner*—John B. Sotomayor
*Attorney, Agent, or Firm*—Freddie M. Bush

[57] ABSTRACT

Tracking means for establishing a line-of-sight between a control point to which the second craft is being guided and tracking the line-of-sight to follow the second craft and deriving a signal $\dot{\theta}_a$ representing the rate of rotation of the line-of-sight about the control point; monitoring means for deriving a signal representing the displacement e of the first craft from the line-of-sight, a signal representing the range $R_m$ between the first craft and the control point, and a signal representing the rate of change $\dot{R}_m$ of the range $R_m$, presetting means for providing a signal representing a positive quantity k; and a computer for deriving signals representing $\dot{\theta}_c$, $\ddot{\theta}_c$, $\dddot{\theta}$ and k to satisfy the equation $$\dddot{\theta}_c = (1-k)(k-2)\dot{\theta}^3 + \frac{(k-3)}{(k-2)} \frac{\ddot{\theta}_c^2}{\dot{\theta}_c}$$

and minimize the difference $\dot{\theta} - \dot{\theta}_a$, k being initially set equal to $k_1$; control means for deriving from the representations provided by the computer a signal representing $f(e) + R_m \ddot{\theta}_c + 2\dot{R}_m \dot{\theta}_c$ wherein $f(e)$ is a function of e; and guidance means for causing the first craft to develop an acceleration transverse to the said line-of-sight, of a magnitude determined by the control signal.

3 Claims, 1 Drawing Sheet

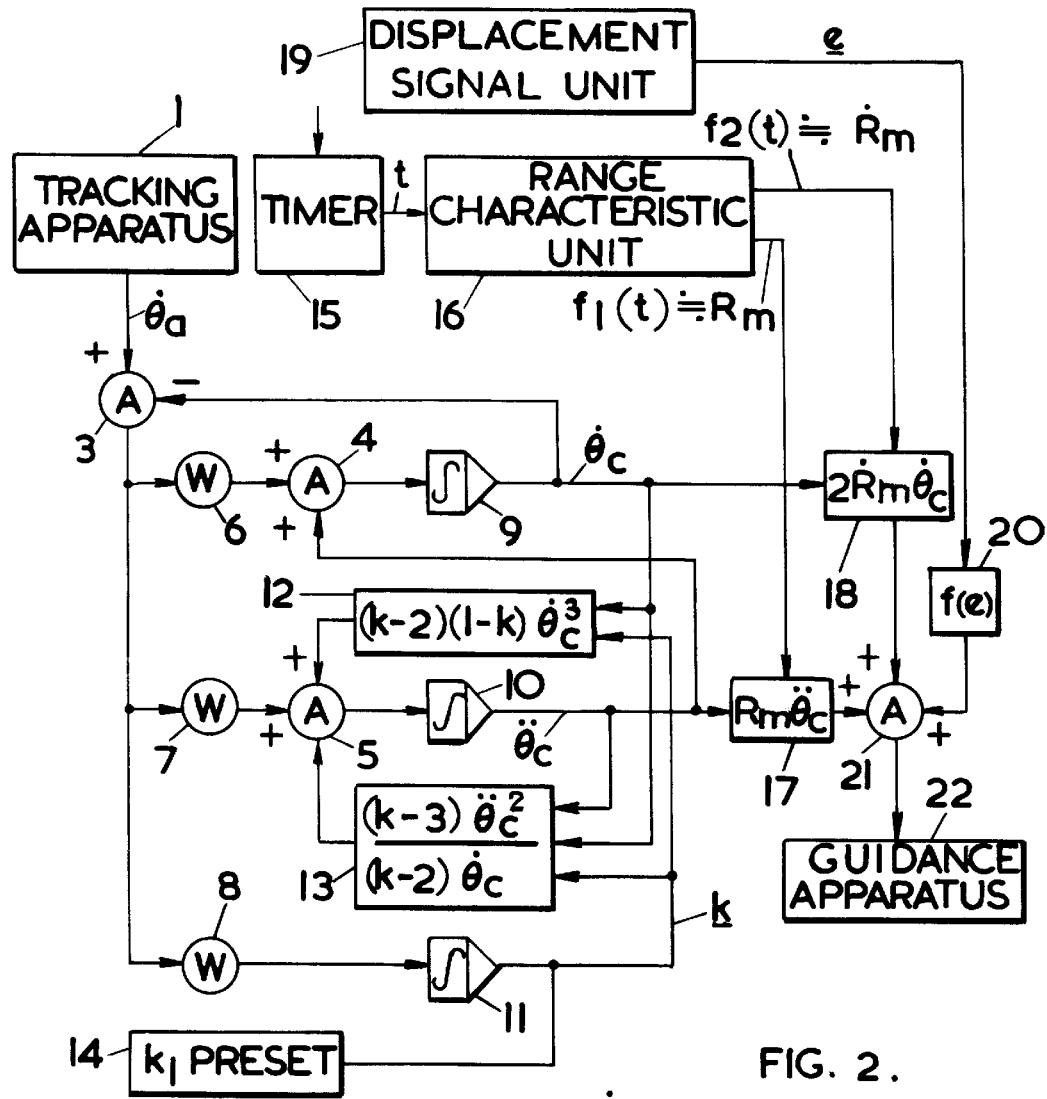
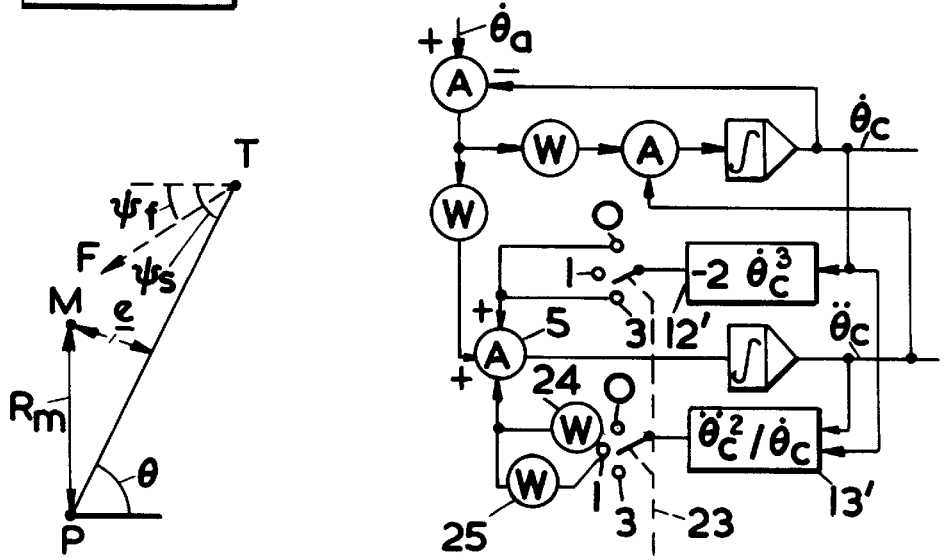
FIG. 1.   FIG. 2.   FIG. 3.

APPARATUS FOR DIRECTING A MOBILE CRAFT TO A RENDEVOUS WITH ANOTHER MOBILE CRAFT

FIELD OF THE INVENTION

The present invention relates to apparatus for guiding a first mobile craft to a meeting with a second mobile craft. In this specification the term 'mobile craft' should be interpreted widely so as to include any kind of aircraft, spacecraft, or guided missile. The apparatus may for instance be used to guide a defensive missile to intercept an attacking missile, or to guide a space craft towards a space station or mother spacecraft.

BACKGROUND OF THE INVENTION

It is known that a defensive missile may be guide towards an attacking craft by control signals derived from measurements of a line-of-sight from a control point to the attacking craft. To avoid confusion the attacking craft will hereafter be called the target. The line-of-sight may be establish by visible light, infra-red light, radar signals, or any other form of radiation which can be projected along a measurable straight-line axis which will be moved either manually or automatically so that it always points towards the target, by apparatus incorporating means for deriving a signal $\dot{\theta}_a$ representing the rate of rotation $\dot{\theta}$ of the line-of-sight. It is known also to derive signals representing the displacement e of the missile from the line-of-sight, the range $R_m$ from the control point to the missile, and its rate of change $\dot{R}_m$, and to derive from these signals a control signal representing the quantity $f(e) + R_m \theta_c + 2\dot{R}_m \dot{\theta}_c$ where $f(e)$ is a predetermined function of e, $\dot{\theta}_c$ is derived from $\dot{\theta}_a$ by a simple smoothing circuit and the term $\ddot{\theta}_c$ (which represents the rate of change of $\dot{\theta}_c$) is derived from $\dot{\theta}_c$ by a simple differentiating circuit. This control signal is used to govern an acceleration applied to the missile transverse to the line-of-sight, so as to increase the accuracy of the rendezvous or the chance of meeting with the target.

It is known also that mobile craft are often guided towards a specified destination by a technique called proportional navigation, in which the flight of the craft is made to rotate at a rate k times the rate of rotation of a sight-line from the craft to its destination where k has a predetermined value. Various values of k in the range from 0 to 5 have been used in various applications of the technique.

BRIEF DESCRIPTION OF THE INVENTION

It is an object of the invention to provide apparatus for guiding a first mobile craft towards a rendezvous or meeting with a second mobile craft which improves the above-mentioned smoothing and differentiation by making use of the assumption or knowledge that the second craft is being guided towards a known destination by a proportional navigation technique.

According to the present invention there is provided apparatus for directing a first mobile craft to a rendezvous with a second mobile craft which is being guided towards a control point, comprising; tracking means for establishing a line-of-sight between the control point and the second mobile craft and tracking the said line-of-sight to follow the said second mobile craft and deriving a signal $\dot{\theta}_a$ representing the rate of rotation $\dot{\theta}$ of the said line-of-sight about the control point; monitoring means for deriving a displacement signal representing the displacement e of the first mobile craft mobile craft from the line-of-sight, a range signal representing the range $R_m$ from the control point to the first mobile craft, and a range rate signal representing the rate of change $\dot{R}_m$ of the range $R_m$; presenting means for representing a selectable position quantity $k_1$; computing means to the signals representing $\dot{\theta}_a$ and $k_1$ for deriving representations of quantities $\dot{\theta}_c$, $\ddot{\theta}_c$, $\theta$ and k tending to become consistent with the equation $$\ddot{\theta}_c = (1-k)(k-2)\dot{\theta}_c^3 + \frac{(k-2)}{(k-2)} \frac{\ddot{\theta}_c^2}{\dot{\theta}_c}$$

so that $\dot{\theta}_c = \int \ddot{\theta}_c dt$, $\theta_c = \theta \int \dot{\theta} dt$ and the difference $\dot{\theta}_c - \dot{\theta}_a$ is minimised, the symbol $\int dt$ indicating integration with respect to time and k being initially set equal to $k_1$; control means for deriving from the aforesaid representations a control signal representing a quantity $f(e) + R_m \theta_c + 2\dot{R}_m \dot{\theta}_c$ wherein $f(e)$ is a predetermined function of e; and guidance means for causing the said first mobile craft to develop an acceleration transverse to the said line-of-sight, of a magnitude dependent on the said control signal.

The computing means may be a stochastic controller operating according to the novel equation which relates the quantities $\dot{\theta}_c$, $\ddot{\theta}_c$, $\theta$ and k as hereinbefore specified.

The first mobile craft may be a missile or rocket, in which case the signals representing $R_m$ and $\dot{R}_m$ may be derived from a measurement of the time elapsed since the missile or rocket was launched and a knowledge of the characteristics of its type assuming that its performance will be typical of its kind. The displacement e must be measured; this may be done by various available known techniques.

An appropriate value for $k_1$ should be selected by an operator to equal the constant k used in the preportional navigation control system of the second mobile craft—this may be known as a characteristic of the type of craft, or estimated or guessed with the help of observations made. Values of k in the range from 0 to 5 are probable. The embodiment hereinafter described will not operate satisfactorily in cases where k comes close to the value k=2; for such cases an alternative arrangement described in a separated co-pending application by the same inventors Some simplified embodiments of the invention may be constructed to operate on the assumption or approximation that k will have a selected constant value so that k=0 or 1 or 3 for instance. In these cases, the equation used will clearly reduce to a simpler form and a simpler form of computing means can be used. Other embodiments are constructed to treat k as an unknown constant which has been estimated, and will modify the value of k if this gives closer agreement with the stated conditions.

Embodiments of the invention will now be described by way of example only, with reference to the accompanying drawings, of which:

BRIEF DESCRIPTION OF THE DRAWINGS

FIG. 1 is a sketch showing the geometrical relationship of some of the quantities involved in a guidance operation, FIG. 2 is a schematic block diagram of a general form of guidance apparatus, and FIG. 3 is a schematic block diagram of a simpler alternative form for a part of the apparatus of FIG. 2.

DETAILED DESCRIPTION OF THE INVENTION

In FIG. 1, T represents the instantaneous position of a mobile craft which is being by proportional navigation towards a control point P. M represents the instantaneous position of another mobile craft which has been from P and is to be guided to a meeting with the craft now at T. The broken line TF represents the instantaneous direction of flight of the craft at T. The variable angle between this flight vector TF and a stable reference direction is represented by the symbol f, and the variable angle between this reference direction and the line of sight TP is represented by the symbol s. In the craft's proportional navigation system, the rate of rotation s (that is to say the rate of change of the angle s) is measured and the flight direction is controlled so that its rate of rotation f is k times s.

At the control point P, the angle between the sight line PT and a stable reference direction is represented by the symbol $\theta$. The rate of rotation $\dot{\theta}$ of the sight line PT (which is the rate of change of $\theta$) is measured. The instantaneous range of the craft now at M from the control point P (ie the distance MP) is represented by the symbol $R_m$ and the displacement of the craft M from the sight line PT is represented by the symbol e. In practice e may be deduced from a measurement of the angle MPT and a knowledge of the range $R_m$. Since the sight line PT or TP is always a single straight line between points T and P, it follows that the rate of rotation $\dot{\psi}s$ must be equal to the rate of rotation $\dot{\theta}$. Using this fact and the equation $\dot{\psi}f=k\dot{\psi}s$ it can be shown that the derivatives $\dot{\theta}$, $\ddot{\theta}$ and $\dddot{\theta}$ should satisfy the equation $$\dddot{\theta} = (1-k)(k-2)\dot{\theta}^3 + \frac{(k-3)\ddot{\theta}^2}{(k-2)\dot{\theta}}$$

FIG. 2 shows apparatus which utilises this fact. A tracking apparatus 1 provides a signal $\dot{\theta}_a$ representing $\dot{\theta}$, which is applied to analogue computing apparatus arranged as a stochastic controller. This comprises analogue signal combines 3, 4 and 5, analogue signal weighting units 6, 7 8, integrators 9, 10, 11, and analogue signal computing networks 12 and 13 arranged as shown. The signs+and −adjacent to the inputs of the combiner 3 indicate that it derives a signal representing the difference ($\dot{\theta}_a - \dot{\theta}_c$) of the quantities represented by the signals applied to it. The other combiners 4 and 5 combine their input signals additively. The integrator 11 is connected to a presenting unit 14, which is manually set to make the output of integrator 11 initially represent a selected value $k_1$. The computing network 12 is connected to receive inputs representing k and $\dot{\theta}_c$ and to derive an output representing the product $(k-2)(1-k)\dot{\theta}_c^3$. The computing network 13 is connected to receive inputs representing k, $\dot{\theta}_c$ and $\ddot{\theta}_c$ and to derived an output representing the function $$\frac{(k-3)\ddot{\theta}_c^2}{(k-2)\dot{\theta}_c}$$

These units 3 to 14 are each constructed according to conventional techniques of the analogue computing art. The weighting 6, 7 and 8 are adjusted, following the techniques described for instance in 'Applied Optimal Control' by A. E. Bryson and Y. C. Ho, (Blaisdell Publishing Co. 1969) at p 425 et seq so that the whole combination (units 3 to 14) will operate as a stochastic controller to derive signals which tend to become consistent with the $$\dddot{\theta}_c = (1-k)(k-2)\dot{\theta}_c^3 + \frac{(k-3)\ddot{\theta}_c^2}{(k-2)\dot{\theta}_c}$$

$$\ddot{\theta}_c = \int \dddot{\theta}_c \, dt$$

$$\dot{\theta}_c = \int \ddot{\theta}_c \, dt$$

and minimise the difference $\dot{\theta}_a - \dot{\theta}_c$ (that is to say also making $\dot{\theta}_c$ follow $\dot{\theta}_a$). This provides a signal representing $\ddot{\theta}_c$ which may be taken as a good approximation to $\ddot{\theta}$, and is derived by a process which improves the differentiation and can be made satisfactorily stable and comparatively free from noise.

A timer 15 is connected to receive a launch timing signal from launching apparatus (not shown) and to provide a signal representing t, the time elapsed since launching of the craft M in FIG. 1. A range characteristic unit 16 receives the t signal and derives signals representing $f_1(t)=R_m$ and $f_2(t)=\dot{R}_m$ according to stored characteristics relevant to the type of the craft M; the elapsed time t is represented digitally and the unit 16 is a digital computer store loaded with values of $f_1(t)$ and $f_2(t)$ in addresses which are values of t. The unit 16 converts the stored values to analogue form. An analogue multiplier 17 is connected to receive the $R_m$ signal from unit 16 and the $\ddot{\theta}_c$ signal from the integrator 10 and to form a representation of the product $R_m \ddot{\theta}_c$. Another analogue multiplier 18 is connected to receive the $\dot{R}_m$ signal from unit 16 and the $\dot{\theta}_c$ signal from the integrator 9 and to form a representation of the product $2\dot{R}_m\dot{\theta}_c$. A displacement signal unit 19 derives representing e and an analogue computing network 20 derives a representation of a function f(e); these units and the function f(e) are arrangements well known in the guidance art. Outputs from the units 17, 18 and 20 are additively combined in an analogue combiner 21 to form a control signal which is applied to conventional guidance apparatus 22, which will include means for sending control signals to the craft M.

If k approaches two, the denominator of the term computed by the network 13 will approach zero and it follows that the resulting signals may go out of the allowable range for values of k over a range of values near k=2. This could also happen when $\dot{\theta}_c$ approaches zero, but in practice this will be a case in which $\ddot{\theta}_c$ will probably be less than $\dot{\theta}_c$ so that no difficulties are likely.

FIG. 3 shows a simpler form of the stochastic control which involves the assumption that k will be substantially constant and substantially equal to 0 or 1 or 3. The function computed by the unit 12 in FIG. 2 reduces to zero when k=1 and becomes $-2\dot{\theta}_c^3$ for the cases k=0 or k=3. The function computed by the unit 13 in FIG. 2 reduces to zero if k=3; to $2\ddot{\theta}_c^2/\dot{\theta}_c$ if k−1, and to $1.5\ddot{\theta}_c^2/\dot{\theta}_c$ if k=0. Hence the computing networks can take the simpler forms shown as 12' and 13' in FIG. 3, wherein their outputs are connected via a two-pole triple-throw switch 23 to the combiner 5. As shown the network 13' computes $\ddot{\theta}_c^2/\dot{\theta}_c$ and the multiplying factors 2 or 1.5 are applied by weighting networks 24 and 25 in separate connections from the switch to the combiner 5.

Various modifications are possible. Clearly various parts or all of the calculations could be done by digital rather than analogue techniques, and in the modification of FIG. 3 more switch positions could be provided for other values of k.

What we claim is:

1. Apparatus for directing a first mobile craft to a rendezvous with a second mobile craft which is being guided towards a control point, comprising: tracking means for establishing a line-of-sight between the control point and the second mobile craft and tracking the said line-of-sight to follow the said second mobile craft and deriving a signal $\dot{\theta}_a$ representing the rate of rotation $\dot{\theta}_a$ of the said line-of-sight about the control point; monitoring means for deriving a displacement signal representing the displacement e of the first mobile craft from the said line-of-sight, a range signal representing the range $R_m$ from the control point to the first mobile craft, and a range rate signal representing the rate of change $\dot{R}_m$ of the range $R_m$; presetting means for representing a selectable positive quantity $k_1$; computing means responsive to the signals representing $\dot{\theta}_a$ and $k_1$ for deriving representation of quantities $\dot{\theta}_c$, $\ddot{\theta}_c$, $\bar{\theta}$ and k tending to become consistent with the equation $$\dddot{\theta}_c = (1-k)(k-2)\dot{\theta}_c^3 + \frac{(k-3)}{(k-2)} \frac{\ddot{\theta}_c^2}{\dot{\theta}_c}$$

so that $\dot{\theta}_c = \int \ddot{\theta}_c dt$, $\ddot{\theta}_c - \bar{\theta}$ dt and the difference $\dot{\theta}_c - \dot{\theta}_a$ is minimised the symbol ∫dt indicating integration with respect to time and k being initially set equal to $k_1$; control means for deriving from the aforesaid representations a control signal representing a quantity $f(e) + R_m \ddot{\theta}_c + 2 \dot{R}_m \dot{\theta}_c$ wherein f(e) is a predetermined function of e; and guidance means for causing the said first mobile craft to develop an acceleration transverse to the said line-of-sight, of a magnitude dependent on the said control signal.

2. Apparatus as claimed in claim 1 wherein the computing means is a stochastic controller operating according to the novel equation which relates the quantities $\dot{\theta}_c$, $\ddot{\theta}_c$, $\bar{\theta}$ and k as set out in claim 1.

3. Apparatus as claimed in claim specifically for use in circumstance where the first mobile craft is a missile or rocket wherein the monitoring means is arranged to derive signals representing $R_m$ and $\dot{R}_m$ from a measurement of the time elapsed since the missile ore rocket was launched and predetermined parameters stored in the apparatus representing known performance characteristics of that type of rocket or missile.

* * * * *